United States Patent [19]

Sakai et al.

[11] 4,081,494
[45] Mar. 28, 1978

[54] PROCESS FOR PREPARING SOFT TRANSPARENT POLYETHER POLYESTER BLOCK COPOLYMERS

[75] Inventors: Hiroshi Sakai; Yoshihiko Takeuchi; Shizuka Kurisu, all of Iwakuni, Japan

[73] Assignee: Teijin Limited, Osaka, Japan

[21] Appl. No.: 641,038

[22] Filed: Dec. 15, 1975

[30] Foreign Application Priority Data

Dec. 14, 1974 Japan .............................. 49-143044
Oct. 30, 1975 Japan .............................. 50-129813

[51] Int. Cl.$^2$ .......................................... C08L 67/02
[52] U.S. Cl. ............................ 260/860; 260/45.7 R; 260/45.7 S; 260/45.75 R; 260/45.75 K; 260/45.75 T; 260/45.75 F; 260/45.75 V; 260/45.75 W; 260/45.8 R; 260/45.9 R; 260/45.95 R; 260/876 B
[58] Field of Search .............. 260/860, 861, 862, 872, 260/876 B

[56] References Cited

U.S. PATENT DOCUMENTS

| 3,662,024 | 5/1972 | Greene | 260/863 |
| 3,663,658 | 5/1972 | Scardiglia et al. | 260/861 X |
| 3,839,171 | 10/1974 | Akamatsu et al. | 260/862 X |
| 3,849,515 | 11/1974 | Muller | 260/860 |
| 3,896,098 | 7/1975 | Lasher | 260/872 |
| 3,917,743 | 11/1975 | Schroeder et al. | 260/860 |
| 3,935,166 | 1/1976 | Kanai et al. | 260/860 X |

Primary Examiner—Thomas De Benedictis, Sr.
Attorney, Agent, or Firm—Wenderoth, Lind & Ponack

[57] ABSTRACT

In a process for preparing soft polyesters which comprises reacting (A) terephthalic acid and/or its ester-forming derivative, (B) tetramethylene glycol and/or its ester-forming derivative and (C) a poly(oxyalkylene) glycol having a molecular weight of 500 to 5,000 and a ratio of the number of carbon atoms to that of oxygen atoms of 2 to 4.5, the improvement wherein after the reduced viscosity of the reaction product of the components (A), (B) and (C) has reached 0.1 (dl/g), the reaction product is further reacted with (D) a low-molecular-weight ester compound and/or a high-molecular-weight ester compound containing a terephthalic acid residue and an ethylene glycol residue or a low-molecular-weight ester compound and/or a high-molecular-weight ester compound containing a terephthalic acid residue and a 1,4-cyclohexane dimethanol residue to form a polyester-polyether block copolymer.

6 Claims, No Drawings

PROCESS FOR PREPARING SOFT TRANSPARENT POLYETHER POLYESTER BLOCK COPOLYMERS

This invention relates to a process for preparing soft polyesters having suppleness and transparency.

Heretofore, plasticized polyvinyl chloride resins, because of their superior suppleness and transparency, have gained widespread acceptance as materials for tubes or various containers used in medical and foodstuff fields. Since, however, the plasticized polyvinyl chloride usually contains a large quantity of a plasticizer such as a phthalic acid ester in order to impart suppleness, it suffers from the defect that the plasticizer bleeds out during use to harm the human body. In addition, the unreacted vinyl chloride monomer remaining in the polyvinyl chloride is toxic and poses a serious problem.

Research and development efforts have been brisk in recent years to find materials that can replace the plasticized polyvinyl chloride resins, and thermoplastic elastomers of the aromatic polyester type have attracted attention because of their non-toxic nature and suppleness. The conventional polyester elastomers, however, lack transparency which is an important property required of a material for tubes and various containers used in medical and foodstuff fields.

Accordingly, it is an object of this invention to provide a thermoplastic aromatic polyester elastomer having improved transparency.

The above object of this invention can be achieved by an improved process for preparing soft polyesters of improved transparency in accordance with this invention which comprises reacting (A) terephthalic acid and/or its ester-forming derivative, (B) tetramethylene glycol and/or its ester-forming derivative and (C) a poly(oxyalkylene) glycol, having a molecular weight of 500 to 5,000 and a ratio of the number of carbon atoms to that of oxygen atoms of 2 to 4.5, and/or its ester-forming derivative, wherein after the reduced viscosity of the reaction product of the components (A), (B) and (C) has reached 0.1 (dl/g), the reaction product is further reacted with (D) a low-molecular-weight ester compound and/or a high-molecular-weight ester compound containing a terephthalic acid residue and an ethylene glycol residue or a low-molecular-weight ester compound and/or a high-molecular-weight ester compound containing a terephthalic acid residue and a 1,4-cyclohexane dimethanol residue to form a polyester-polyether block copolymer.

Examples of the ester-forming derivative of terephthalic acid used as component (A) are $C_1$-$C_5$ lower alkyl esters of terephthalic acid such as dimethyl terethalate, and aryl esters of terephthalic acid such as diphenyl terephthalate.

Examples of the ester-forming derivative of tetramethylene glycol used as component (B) are $C_1$-$C_5$ aliphatic monocarboxylic acid esters of tetramethylene glycol such a mono- or diacetate of tetramethylene glycol.

Examples of the poly(oxyalkylene) glycol used as component (C) include poly(oxytetramethylene) glycol, poly(oxypropylene) glycol, poly(oxyethylene) glycol, and poly(oxyhexamethylene) glycol. These poly(oxyalkylene) glycols are not limited to homopolymers, but may include copolymers, a typical example of which is an ethylene oxide/propylene oxide copolymer. Furthermore, these poly(oxyalkylene) glycols may be used either alone or in combination of two or more.

Examples of the ester-forming derivative of the poly(oxyalkylene) glycol are monoesters or diesters formed between the poly(oxyalkylene) glycols and $C_1$-$C_5$ aliphatic monocarboxylic acids.

Of the above poly(oxyalkylene) glycols, poly(oxytetramethylene) glycol and poly(oxyethylene) glycol are preferred. The poly(oxytetramethylene) glycol is especially preferred.

Examples of the low-molecular-weight ester compound and/or the high-molecular-weight ester compound containing a terephthalic acid residue and an ethylene glycol residue that can be used as component (D) are compounds expressed by the following formula

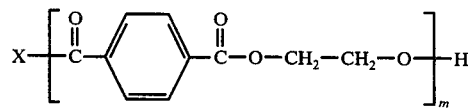

wherein X is HC— or HO—$CH_2$—$CH_2$—O—, and $m$ is 1 to 200, preferably 1 to 10. An especially preferred species is a compound of the above formula in which X is HO—$CH_2$—$CH_2$—O— and $m$ is 1, that is, bis-$\beta$-hydroxyethyl terephthalate (to be referred to as BHET). BHET is convenient for the object of this invention since it is easy to prepare and has a relatively low melting point. The BHET can be prepared, for example, by reacting terephthalic acid and ethylene oxide or ethylene glycol, or reacting dimethyl terephthalate and ethylene glycol in the presence of an ordinary ester-interchange catalyst. BHET obtained by such a method, either unpurified or purified, can be used in this invention. Thus, for example, the monomer obtained by the above ester-interchange method can be used directly. If desired, polymerized BHET can also be used.

Examples of the low-molecular-weight ester compound and/or the high-molecular-weight ester compound containing a terephthalic acid residue and a 1,4-cyclohexane dimethanol residue that can be used as component (D) are compounds of the following formula

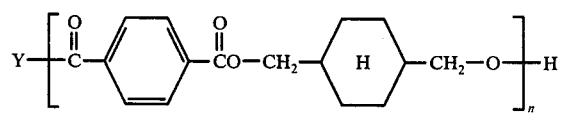

wherein Y is HO— or

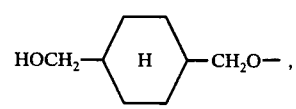

and $n$ is 1 to 200, preferably 1 to 10. Such a compound can be obtained, for example, by esterifying terephthalic acid with 1,4-cyclohexane dimethanol, or subjecting a dialkyl terephthalate and 1,4-cyclohexane dimethanol to an ester interchange reaction, and if desired, polymerizing the resulting reaction product.

The 1,4-cyclohexane dimethanol is preferably a trans-isomer, but may be a cis-trans mixture containing more than 50% of a trans-isomer.

In the process of this invention, a trifunctional or higher compound can be added as a cross-linking agent in order to modify the resulting polymer in various ways. Examples of the polyfunctional compound are glycerin, 1,1,1-trimethylol propane, tris(2-hydroxyethyl) isocyanurate, trimellitic acid, and pyromellitic acid. Preferably, the amount of the polyfunctional compound to be copolymerized is 0.01 to 0.5% by weight.

In the process of this invention, first the components (A), (B) and (C) are reacted, and after the reduced viscosity of the resulting reaction product has reached 0.1 (dl/g), the component (D) is added. The reduced viscosity of the polymer is a value determined at 35° C. for a solution of 1.2 g of the polymer dissolved in 100 ml. of o-chlorophenol. It is especially preferable to add component (D) when the reduced viscosity of the reaction product of the components (A), (B) and (C) is 0.15 to 2 dl/g. If the component (D) is added when the reduced viscosity of the product is less than 0.1 dl/g, the transparency of the resulting polymer cannot be improved.

The amount of component (C) which forms a soft segment in the resulting block copolymer is 10 to 85% by weight, preferably 20 to 75% by weight, of the final polymer after reacting the component (D). When the amount of the component (C) is less than 10% by weight in the final polymer, the suppleness of the polymer is insufficient. On the other hand, when the amount of component (C) exceeds 85% by weight, the moldability of the polymer is poor or the polymer becomes tacky.

The ratio of component (B), forming a hard segment, to the component (D), forming a hard segment, is such that in the final polymer, the proportion of the ethylene glycol component or the 1,4-cyclohexane dimethanol component in the component (D) is 5 to 60 mole%, preferably 10 to 50 mole%, based on the total amount of the component (B) and the ethylene glycol component or the 1,4-cyclohexane dimethanol component in component (D). When the proportion of the ethylene glycol component or the 1,4-cyclohexane dimethanol component is less than 5 mole%, the transparency of the polymer is not satisfactory.

In the process of this invention, the reaction is carried out preferably in the presence of a catalyst. Examples of suitable catalysts are titanium compounds such as tetrabutyl titanate, tetramethyl titanate, tetraethyl titanate, tetrapropyl titanate, potassium titanium oxalate or titanium oxide, tin compounds such as stannous acetate, di-n-butyl tin dilaurate, di-n-butyl tin oxide or dibutyl tin diacetate, a combination of zinc acetate and antimony oxide, a combination of zinc acetate and germanium oxide, and lead acetate. Of these, the titanium compounds are preferred. Preferably, the amount of the catalyst is 0.003 to 0.7% by weight based on the total amount of the resulting polymer.

The suitable polymerization reaction temperature is from the melting point of the resulting polymer to 270° C. When it is higher than 270° C, the polymer is markedly deteriorated.

In the process of this invention, other additives can also be incorporated so long as they do not adversely affect the final product. Examples of such additives are antioxidants, light stabilizers, polymerization promoters, fillers, bleaching agents, and coloring agents. Specific examples of the antioxidants are phenolic compounds such as 4,4'-bis(2,6-di-tert.-butyl phenol), Irganox 1010 ®, Inganox 1035 ®, or Irganox 1076 ® (the registered trademarks are of Ciba Geigy Company), amine compounds such as N,N'-bis (β-naphthyl)-paraphenylenediamine, and sulfur compounds such as dilauryl thiodipropionate. The amount of the antioxidant is usually 0.01 to 5% by weight based on the polymer. Specific examples of the light stabilizer are substituted benzotriazole compounds such as Tinuvin 327 ®, and substituted benzophenones such as Sumisorb 90 ®, Sumisorb 110 ® and Sumisorb 130 ® (the registered trademarks are of Sumitomo Chemical Co., Ltd.). The amount of the light stabilizer is usually 0.01 to 5% by weight based on the polymer.

These additives can be incorporated by any desired method. For example, they can be mixed with the molten polymer during or after its preparation. Or they can be pre-mixed with the polymer chips, and the mixture can be melt-mixed in an extruder.

According to the process of this invention, the discrepancy in the composition of the copolymer among different batches can be markedly reduced, as compared with a conventional polymerization method in which ethylene glycol or 1,4-cyclohexane dimethanol is fed at the time of reacting the components (A), (B) and (C).

As a quite unexpected result, the polymer obtained by the process of this invention has outstanding transparency as compared with polymers obtained by the above conventional method.

Since the polyester obtained by the process of this invention does not require a plasticizer, there is no anxiety about the toxicity of a plasticizer that may bleed out from the polymer. In addition, the resulting polyester is sufficiently transparent and supple. Accordingly, the soft transparent polyesters obtained by the process of this invention can find great utility as materials for tubes, bottles or various other containers used in medical and foodstuff fields. They are especially useful as materials having a thickness of less than about 5 mm.

The following Examples and Comparative Examples illustrate the present invention in greater detail.

In these examples, all parts are by weight. The reduced viscosity of the polymer is a value calculated from its solution viscosity measured at 35° C. for a solution of 1.2 g of the polymer dissolved in 100 ml. of o-chlorophenol. The softening point is a value measured by a Vicat softening point measuring device. The hardness (Durometer hardness, Type A) was measured in accordance with ASTM D-2240. The transparency was measured as follows: The chips of the polymer were dried, and then melted in an atmosphere of nitrogen. The molten polymer was made into a 2 mm-thick sheet, and rapidly cooled in ice water. The transparency of the resulting sheet was measured by a Poic sphere method turbidimeter (SEP-TU type) (a product of Nippon Seimitsu Kogaku Kabushiki Kaisha).

EXAMPLE 1

(A) Preparation of bis(β-hydroxyethyl) terephthalate:-

A reactor equipped with a distillation device was charged with 97.1 parts of dimethyl terephthalate, 62.1 parts of ethylene glycol and 0.14 part of tetrabutyl titanate, and they were heated to 180° to 220° C at atmospheric pressure. Methanol formed was distilled out in an amount corresponding to 99% of the theoretical amount. The resulting bis(β-hydroxyethyl) terephthalate was directly used as a material for polyester preparation.

(B) Preparation of polyester elastomer:-

A reactor equipped with a stirrer, a distillation device and a nitrogen inlet tube was charged with the materials A, B, C and D shown in Table 1, and they were heated to 180° to 220° C. Methanol formed was distilled out in an amount corresponding to 80 to 90% of the theoretical amount. Subsequently, the reaction temperature was raised to 245° C., and the reaction was carried out for 10 minutes at atmospheric pressure, then for 30 minutes in a weak vacuum of 760 mmHg to about 30 mmHg abs., and for an additional 30 minutes in a high vacuum of 0.1 to 0.3 mmHg abs. The pressure of the reaction system was then returned to atmospheric pressure using nitrogen, and the bis($\beta$-hydroxyethyl) terephthalate (E) was added in the amounts shown in Table 1. The reaction was further carried out for 7 hours in a high vacuum of 0.1 to 0.3 mmHg abs. The resulting polymer was discharged from the reactor, and made into chips. Polymers were prepared in this way using two batches under the same conditions.

Chips of the transparent soft polyester obtained from batch 1 were dried for 2 hours in a hot air dryer at 100° C., and extruded into a tubular article having an outside diameter and a thickness shown in Table 2 using an extruder having an annular die. The cylinder temperature was maintained at 160° to 165° C., and the die temperature, at 160° C., during the extrusion of the polymer. The tubular article was cooled in a water tank and taken up into a roll. The transparency of the tubular article was measured, and the results are shown in Table 2.

These polymers had very good tube-formability, and had a fast rate of crystallization. Accordingly, even when the tube extruded into the water tank through the annular die was immediately taken up, it was not set in the form as taken up. The tubular article was scarcely tacky. In addition, it had excellent transparency comparable to that of a tubular article of plasticized polyvinyl chloride.

The tubular articles obtained in this Example had reduced coloration and were nearly colorless, promising high utility in medical and foodstuff fields.

Table 2

| | Outside diameter (mm) | Thickness (mm) | Transmittance under parallel light rays (%) | Whole light transmittance (%) | Cloud value (%) |
|---|---|---|---|---|---|
| Run No. 1 | 4.5 | 0.5 | 73.9 | 79.4 | 6.9 |
| Run No. 2 | 6.6 | 0.9 | 71.9 | 75.2 | 4.4 |
| Polyvinyl chloride tube* | 3.9 | 0.6 | 69.7 | 84.0 | 17.0 |

*a tube of polyvinyl chloride incorporated in an infusion set (a product of Japan Medical Supply Co., Ltd.)

The results obtained are shown in Table 1.

Table 1

| | Unit | Batch 1 | Batch 2 |
|---|---|---|---|
| Poly(oxytetramethylene)glycol | (molecular weight) | 1968 | 1968 |
| Amounts | | | |
| A. Poly(oxytetramethylene) glycol | parts | 7.32 | 7.32 |
| B. Dimethyl terephthalate | parts | 2.66 | 2.66 |
| C. Tetramethylene glycol | parts | 1.81 | 1.81 |
| D. Tetrabutyl titanate | parts | 0.0037 | 0.0037 |
| E. bis($\beta$-hydroxyethyl) terephthalate | parts | 1.26 | 1.26 |
| Reduced viscosity | | | |
| Before adding bis($\beta$-hydroxyethyl) terephthalate | dl/g | 1.44 | 1.50 |
| Final polymer | dl/g | 2.60 | 2.54 |
| Polymer composition | | | |
| Poly(oxytetramethylene) glycol in the final polymer | wt. % | 67 | 67 |
| Ratio of ethylene glycol to the sum of ethylene glycol and tetramethylene glycol in the final product | molar ratio | 0.33 | 0.31 |
| Vicat softening point | ° C. | 150 | 152 |
| Hardness | — | 79 | 81 |
| Color | | | |
| (Chip specimens were measured by a Hunter color meter) L value | — | 58.3 | 70.6 |
| a value | — | −2.1 | +0.6 |
| b value | — | +6.4 | +8.5 |
| Transparency | | | |
| Transmittance under parallel light rays | % | 30.0 | 32.0 |
| Whole light transmittance | % | 63.5 | 65.0 |
| Cloud value | % | 52.8 | 50.8 |

The difference in softening point between the above two batches was 2° C., and this indicates that the amounts of tetramethylene glycol and ethylene glycol copolymerized were substantially constant. Thus, discrepancy between the batches was only slight.

The transparency of each of the polymers obtained was much higher than that of the polymers obtained in Comparative Example 1.

COMPARATIVE EXAMPLE 1

A reactor equipped with a stirrer, a distillation device and a nitrogen introducing tube was charged with the materials shown in Table 3, and they were heated to 180° to 220° C. Methanol formed was distilled out in an amount corresponding to 80 to 90% of the theoretical amount. Subsequently, the reaction temperature was raised to 245° C., and the reaction was carried out for 10 minutes at atmospheric pressure, then for 30 minutes in a weak vacuum of 760 mmHg to about 30 mmHg abs., and for an additional 5.5 hours in a high vacuum of 0.1 to 0.3 mmHg abs. The polymer was discharged from the reactor, and made into chips. Polymers were prepared in this way using three batches under the same conditions. The results are shown in Table 3. Prior to polymerization of each batch, the reactor was washed with tetramethylene glycol.

set forth in paragraph (A) of Example 1 was added in the amount shown in Table 4. The reaction was continued for an additional 2 hours and 40 minutes in a high vacuum of 0.1 to 0.3 mmHg abs. The pressure of the inside of the reactor was returned to normal atmospheric pressure using nitrogen, and the resulting polymer was collected in the molten state. The molten polymer was made into a sheet having a thickness of 2 mm, and rapidly cooled in ice water to form a sheet.

Table 3

|  | Unit | Batch 1 | Batch 2 | Batch 3 |
|---|---|---|---|---|
| Poly(oxytetramethylene) glycol | (molecular weight) | 2000 | 2000 | 2000 |
| Amounts |  |  |  |  |
| poly(oxytetramethylene) glycol | parts | 6.50 | 6.50 | 6.50 |
| dimethyl terephthalate | parts | 3.35 | 3.35 | 3.35 |
| tetramethylene glycol | parts | 0.76 | 0.76 | 0.76 |
| ethylene glycol | parts | 0.78 | 0.78 | 0.78 |
| butoxy titanate | parts | 0.0050 | 0.0050 | 0.0050 |
| Reduced viscosity of final polymer | dl/g | 2.14 | 2.56 | 2.49 |
| Polymer composition |  |  |  |  |
| poly(oxytetramethylene)glycol in the final polymer | wt % | 66 | 66 | 66 |
| ratio of ethylene glycol to the sum of ethylene glycol and tetramethylene glycol in the final polymer | molar ratio | 0.30 | 0.18 | 0.25 |
| Vicat softening point | °C | 154 | 166 | 160 |
| Hardness | — | 77 | 82 | 81 |
| L value | — | 59.8 | 56.7 | 59.1 |
| Color a value | — | −0.8 | +0.5 | −1.5 |
| b value | — | +10.8 | +12.3 | +11.4 |
| Transparency |  |  |  |  |
| transmittance under parallel light rays | % | 8.8 | 10.0 | 13.3 |
| whole light transmittance | % | 39.3 | 31.5 | 33.2 |
| cloud value | % | 77.6 | 68.3 | 59.9 |

The difference between the highest softening point and the lowest one in the above three batches was 12° C. This means that the discrepancy in the proportions of tetramethylene glycol and ethylene glycol copolymerized in the resulting polymer is greater than in the case of Example 1. Furthermore, the transparency of the samples in these comparison runs was much inferior to that of the samples obtained in Example 1.

Chips of the polymer obtained in batch 1 were extruded into a tubular form in the same way as in the production of tubes in Example 1, cooled in a water tank, and wound up into a roll. The resulting tube had an outside diameter of 6.8 mm, a thickness of 0.8 mm, a light transmittance under parallel light rays of 31.5%, a whole light transmittance of 40.2%, and a cloud value of 22.1%.

The transparency of this tube was much inferior to that of the tube obtained in Example 1.

EXAMPLE 2

A reactor equipped with a stirrer, a distillation device and a nitrogen-introducing tube was charged with the materials A, B, C and D shown in Table 4. They were heated to 180° to 220° C., and methanol formed was distilled out in an amount corresponding to 90% of the theoretical amount. Then, the reaction temperature was raised to 245° C., and the reaction was performed for 10 minutes at atmospheric pressure. The reaction was further carried out for 30 minutes in a weak vacuum of from 760 mmHg to about 30 mmHg abs., and for an additional 30 minutes at 0.1 to 0.3 mmHg abs. The pressure of the inside of the reactor was returned to normal atmospheric pressure using nitrogen, and the bis(β-hydroxyethyl) terephthalate prepared by the method Table 4

|  | Unit | Example 2 |
|---|---|---|
| Poly(oxytetramethylene) glycol | (molecular weight) | 1968 |
| Amounts |  |  |
| A. Poly(oxytetramethylene)glycol | parts | 66.6 |
| B. Dimethyl terephthalate | parts | 33.3 |
| C. Tetramethylene glycol | parts | 16.6 |
| D. Tetrabutyl titanate | parts | 0.05 |
| E. bis(β-Hydroxyethyl) terephthalate | parts | 11.5 |
| Reduced viscosity |  |  |
| Before adding bis(β-hydroxyethyl) terephthalate | dl/g | 0.90 |
| Final polymer | dl/g | 2.15 |
| Polymer composition |  |  |
| Poly(oxytetramethylene) glycol of the final polymer | wt. % | 60 |
| Ratio of ethylene glycol to the sum of ethylene glycol and tetramethylene glycol | molar ratio | 0.25 |
| Vicat softening point | °C. | 151 |
| Hardness (Shore A) | — | 87 |
| L value | — | 59.0 |
| Color a value | — | −1.1 |
| b value | — | +7.0 |
| Transparency |  |  |
| Transmittance under parallel light rays | % | 23.5 |
| Whole light transmittance | % | 43.8 |
| Cloud value | % | 46.3 |

EXAMPLE 3

Polymers were prepared in the same way as in Example 2 using the materials shown in Table 5. The results are shown in Table 5.

Table 5

| | Unit | Example 3 |
|---|---|---|
| Poly(oxytetramethylene) glycol | (molecular weight) | 1,500 |
| Amounts | | |
| A. Poly(oxytetramethylene) glycol | parts | 45.0 |
| B. Dimethyl terephthalate | parts | 29.9 |
| C. Tetramethylene glycol | parts | 27.7 |
| D. Tetrabutyl titanate | parts | 0.05 |
| E. bis($\beta$-Hydroxyethyl) terephthalate | parts | 31.5 |
| Reduced viscosity | | |
| Before adding BHET | dl/g | 0.75 |
| Final polymer | dl/g | 1.81 |
| Polymer composition | | |
| Poly(oxytetramethylene) glycol in the final polymer | wt. % | 45 |
| Ratio of ethylene glycol to the sum of ethylene glycol and tetramethylene glycol | molar ratio | 0.50 |
| Vicat softening point | ° C. | 170.0 |
| Hardness | — | 90 |
| Transparency | | |
| Transmittance under parallel light rays | % | 36 |
| Whole light transmittance | % | 65 |
| Cloud value | % | 45 |

EXAMPLE 4 AND COMPARATIVE EXAMPLE 2

Polymers were prepared in the same way as set forth in paragraph (B) of Example 1 except that the time of adding bis($\beta$-hydroxyethyl) terephthalate was changed. The transparency of each of the polymers obtained was measured. The results are shown in Table 6. For comparison, Table 6 also shows the results obtained in Example 1.

Table 6

| | Example 1 | Example 4 | Comparative Example 2 |
|---|---|---|---|
| Reduced viscosity before adding bis($\beta$-hydroxyethyl) terephthalate | 1.44 | 0.75 | 0.07 |
| Transparency | | | |
| LIght transmittance under parallel light rays (%) | 30.0 | 29.5 | 16.7 |
| Whole light transmittance (%) | 63.5 | 60.8 | 42.6 |
| Cloud value | 52.8 | 51.5 | 60.8 |

EXAMPLE 5

(A) Preparation of bis(4-hydroxymethylcyclohexylmethyl) terephthalate:-

A reactor equipped with a distillation device was charged with 97.0 parts of dimethyl terephthalate, 144 parts of 1,4-cyclohexane dimethanol (cis/trans=30/70) and 0.051 part of tetrabutyl titanate, and they were heated to 170° to 220° C. at atmospheric pressure. Methanol formed was distilled out in an amount corresponding to 99% of the theoretical amount. The resulting bis(4-hydroxymethylcyclohexylmethyl) terephthalate was directly used as a material in this Example.

(B) Preparation of polyester elastomer:-

A reactor equipped with a stirrer and a distillation device was charged with the materials shown in Table 7, and they were heated to 180° to 220° C. Methanol formed was distilled out in an amount corresponding to 80 to 90% of the theoretical amount. The reaction product was transferred to a polymerization reactor, and the reaction was carried out at a temperature of 245° C. and atmospheric pressure for 10 minutes.

The bis(4-hydroxymethylcyclohexylmethyl) terephthalate prepared above was added in the amount shown in Table 7. Subsequently, the reaction was carried out for 30 minutes in a weak vacuum of from 760 mmHg to about 30 mmHg abs., and for an additional 2.5 hours in a high vacuum of 0.1 to 0.3 mmHg abs.

Polymers were prepared in this way using two batches under the same conditions. The transparency of each of the polymers obtained was measured in the same way as in Example 1. The results are shown in Table 7.

Table 7

| | Unit | Batch 1 | Batch 2 |
|---|---|---|---|
| Amounts | | | |
| Poly(oxytetramethylene) glycol (average molecular weight 2,000) | parts | 66.0 | 66.0 |
| Dimethyl terephthalate | parts | 22.3 | 22.3 |
| Tetramethylene glycol | parts | 20.9 | 20.9 |
| Tetrabutyl titanate | parts | 0.042 | 0.042 |
| bis(4-Hydroxymethylcyclohexylmethyl) terephthalate (BHCMT) | parts | 16.7 | 16.7 |
| Reduced viscosity | | | |
| Before adding BHCMT | dl/g | 0.24 | 0.23 |
| Final polymer | dl/g | 2.25 | 2.18 |
| Polymer composition | | | |
| Poly(oxytetramethylene) glycol in the final polymer | wt. % | 66 | 66 |
| Ratio of 1,4-cyclohexanedimethanol to the sum of 1,4-cyclohexanedimethanol and tetramethylene glycol | mole ratio | 0.32 | 0.33 |
| Vicat softening point | ° C. | 151 | 150 |
| Transparency | | | |
| Transmittance under parallel light rays | % | 37.5 | 39.0 |
| Whole light transmittance | % | 69.5 | 68.7 |
| Cloud value | % | 46.0 | 43.2 |

The difference in softening point between the polymers obtained from batches 1 and 2 above was 1° C. This means that the proportions of tetramethylene glycol and 1,4-cyclohexane dimethanol copolymerized in the polymer were substantially constant, and discrepancy in proportions between batches was slight.

Furthermore, the transparency of the polymers was much higher than that of the polymers obtained in Comparative Example 3 below.

COMPARATIVE EXAMPLE 3

The same apparatus as used in Example 5 was charged with the materials shown in Table 8, and they were heated to 170° to 220° C. Methanol formed was distilled out in an amount corresponding to 80 to 90% of the theoretical amount. The reaction polymer was transferred into a polymerization reactor, and reacted at 245° C. and atmospheric pressure for 10 minutes. The reaction was further carried out for 30 minutes in a weak vacuum of from 760 mmHg to about 30 mmHg abs., and for an additional 2.5 hours in a high vacuum of 0.1 to 0.3 mmHg abs. Polymers were prepared in this way using three batches under the same conditions.

The transparency of each of the resulting polymers was measured, and the results are shown in Table 8.

Table 8

| | Unit | Batch 1 | Batch 2 | Batch 3 |
|---|---|---|---|---|
| Amounts | | | | |
| Poly(oxytetramethylene) glycol (average molecular weight 2,000) | parts | 66.0 | 66.0 | 66.0 |
| Dimethyl terephtalate | parts | 30.1 | 30.1 | 30.1 |
| Tetramethylene glycol | parts | 14.0 | 14.0 | 14.0 |
| 1,4-Cyclohexane dimethanol (cis/trans=30/70) | parts | 11.0 | 11.0 | 11.0 |
| Tetrabutyl titanate | parts | 0.042 | 0.042 | 0.042 |
| Reduced viscosity | dl/g | 2.25 | 2.31 | 2.28 |

Table 8-continued

| | Unit | Batch 1 | Batch 2 | Batch 3 |
|---|---|---|---|---|
| Polymer composition | | | | |
| Poly(oxytetramethylene) glycol in the final polymer | wt.% | 67 | 66 | 67 |
| Ratio of 1,4-cyclohexane dimethanol to the sum of 1,4-cyclohexane dimethanol and tetramethylene glycol in the final polymer | molar ratio | 0.29 | 0.33 | 0.22 |
| Vicat softening point | °C | 155 | 150 | 162 |
| Transparency | | | | |
| Transmittance under parallel light rays | % | 24.1 | 24.5 | 22.5 |
| Whole light transmittance | % | 58.3 | 53.5 | 51.8 |
| Cloud value | % | 58.7 | 54.2 | 56.6 |

The difference between the highest softening point and the lowest one in the above three batches was 12° C. This means that the discrepancy in the proportions of tetramethylene glycol and 1,4-cyclohexane dimethanol copolymerized in the polymer is much greater than in the case of Example 5. Furthermore, the transparency of the polymer samples obtained in this Comparative Example was much inferior to that of the samples obtained in Example 5.

EXAMPLE 6

(A) Preparation of polyethylene terephthalate:-

A reactor equipped with a distillation device was charged with 97.1 parts of dimethyl terephthalate, 62.1 parts of ethylene glycol and 0.14 part of tetrabutyl titanate, and they were heated to 180° to 200° C. at atmospheric pressure. Methanol formed was distilled out in an amount corresponding to 99% of the theoretical amount. The resulting reaction product was transferred to a polymerization reactor, and reacted at 280° C. at atmospheric pressure for 30 minutes. It was reacted for an additional 30 minutes in a weak vacuum of 760 mmHg abs. to 20 mmHg abs.

The resulting polymer was polyethylene terephthalate having an average polymerization degree of 6. The polymer was used directly for the preparation of a polyester elastomer.

(B) Preparation of polyester elastomer:-

A reactor equipped with a stirrer, a distillation device and a nitrogen-introducing tube was charged with the materials A, B, C and D shown in Table 9, and they were heated to 180° to 220° C. Methanol formed was distilled out in an amount corresponding to 80 to 90% of the theoretical amount. The reaction temperature was then raised to 245° C., and the reaction was performed at atmospheric pressure for 10 minutes. The reaction was further continued for 30 minutes in a weak vacuum of 760 mmHg to about 30 mmHg abs., and then for an additional 30 minutes in a high vacuum of 0.1 to 0.3 mmHg abs. The pressure of the inside of the reactor was returned to normal atmospheric pressure using nitrogen, and the polyethylene terephthalate obtained in (A) above was added in the amount shown in Table 9. The reaction was further carried out for 7 hours in a high vacuum of 0.1 to 0.3 mmHg abs. The polymer was discharged, and made into chips. The results are shown in Table 9.

Table 9

| | Unit | Example 6 |
|---|---|---|
| Poly(oxytetramethylene) glycol | (molecular weight) | |
| Amounts | | |
| A. Poly(oxytetramethylene) glycol | parts | 7.32 |
| B. Dimethyl terephthalate | parts | 2.66 |
| C. Tetramethylene glycol | parts | 1.81 |
| D. Tetrabutyl titanate | parts | 0.0037 |
| E. Polyethylene terephthalate with an average polymerization degree of 6 | parts | 1.00 |
| Reduced viscosity | | |
| Before adding the polyethylene terephthalate having an average polymerization degree of 6 | dl/g | 1.40 |
| Final polymer | dl/g | 2.63 |
| Polymer composition | | |
| Poly(oxytetramethylene) glycol in the final polymer | wt.% | 67 |
| Ratio of ethylene glycol to the sum of ethylene glycol and tetramethylene glycol | molar ratio | 0.32 |
| Vicat softening point | °C. | 151 |
| Hardness | — | 80 |
| Transparency | | |
| Transmittance under parallel light rays | % | 28.1 |
| Whole light transmittance | % | 62.5 |
| Cloud value | % | 55.0 |

What we claim is:

1. In a process for preparing soft polyesters which comprises reacting (A) terephthalic acid and/or its ester-forming derivative, (B) tetramethylene glycol and/or its ester-forming derivative and (C) a poly(oxyalkylene) glycol having a molecular weight of 500 to 5,000 and a ratio of the number of carbon atoms to the number of oxygen atoms of 2 to 4.5, and/or its ester-forming derivative, the improvement wherein, after the reduced viscosity of the reaction product of the components (A), (B) and (C) has reached 0.1 (dl/g), said reaction product is further reacted with (D) a low-molecular-weight ester compound and/or a high-molecular-weight ester compound containing a terephthalic acid residue and an ethylene glycol residue, or a low-molecular-weight ester compound and/or a high-molecular-weight ester compound containing a terephthalic acid residue and a 1,4-cyclohexane dimethanol residue, to form a polyester-polyether block copolymer, the proportion of the ethylene glycol component or the 1,4-cyclohexane dimethanol component in the block copolymer being from 5 to 60 mole % based on the total amount of component (B) and the ethylene glycol component or 1,4-cyclohexane dimethanol component of component (D) in the block copolymer.

2. The process of claim 1 wherein component (D) is a compound of the formula

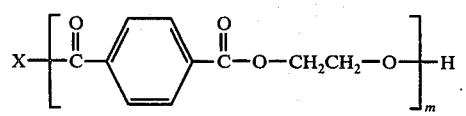

wherein X is HO— or HO—CH$_2$CH$_2$—O—, and m is a number of 1 to 10.

3. The process of claim 1 wherein component (D) is a compound of the formula

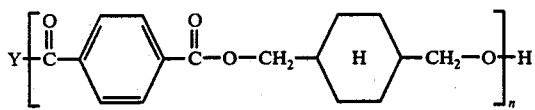

wherein Y is HO— or

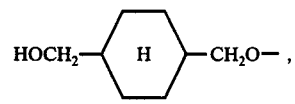

and n is a number of 1 to 10.

4. The process of claim 1 wherein the poly(oxyalkylene) glycol of component (C) is poly(oxytetramethylene) glycol.

5. The process of claim 1 wherein component (C) is used in an amount such that it accounts for 10 to 85% of the total weight of the block copolymer.

6. The process of claim 1 wherein component (D) is added and reacted when the reaction product of components (A), (B) and (C) is within the range of 0.15 to 2 dl/g.

* * * * *